United States Patent [19]
Suess

[11] Patent Number: 6,119,324
[45] Date of Patent: *Sep. 19, 2000

[54] METHOD FOR MAKING EXTRUDED ARTICLES

[75] Inventor: Jack E. Suess, Kentwood, Mich.

[73] Assignee: Newell Manufacturing Company, Lowell, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/701,544

[22] Filed: Aug. 22, 1996

Related U.S. Application Data

[63] Continuation of application No. 08/257,644, Jun. 9, 1994, abandoned.

[51] Int. Cl.[7] .................................... B23P 17/00
[52] U.S. Cl. .................... 29/417; 83/54; 83/425; 83/563; 264/145; 264/157; 264/163
[58] Field of Search ................... 264/145, 146, 264/157, 158, 163, 155; 83/54, 563, 564, 425

[56] References Cited

U.S. PATENT DOCUMENTS

| | | | |
|---|---|---|---|
| 527,963 | 10/1894 | Gay | 83/425 X |
| 1,408,877 | 3/1922 | Funk | 264/151 |
| 3,545,336 | 12/1970 | Sauko | 83/54 X |
| 3,773,883 | 11/1973 | Labbe et al. | 264/151 |
| 3,843,758 | 10/1974 | Maroschak | 264/151 X |
| 3,910,713 | 10/1975 | Maroschak | 83/54 X |
| 4,030,179 | 6/1977 | Schwarz | 29/417 X |
| 4,062,919 | 12/1977 | Rojahn et al. | 264/151 X |
| 4,105,738 | 8/1978 | Rohn | 264/163 |
| 4,169,179 | 9/1979 | Bussey, Jr. | 264/151 X |
| 4,204,447 | 5/1980 | Slaughterbeck | 83/54 X |
| 4,237,567 | 12/1980 | Grube | 29/417 X |
| 4,470,942 | 9/1984 | Beretta | 264/151 X |
| 4,786,452 | 11/1988 | Günzel | 264/158 X |
| 4,981,637 | 1/1991 | Hyer | 264/151 X |
| 5,033,235 | 7/1991 | Stark . | |
| 5,509,795 | 4/1996 | Near et al. | 264/145 X |

FOREIGN PATENT DOCUMENTS

| | | | |
|---|---|---|---|
| 2627889 | 1/1978 | Germany | 264/151 |
| 9002-824 | 1/1984 | Japan | 264/155 |
| 4-189542 | 7/1992 | Japan | 264/145 |

OTHER PUBLICATIONS

Exhibit A includes a photograph of an extruded windowsill of prior art which includes a short slot cut into the sill by a router.

Exhibit B includes phtographs of an extruded window jamb liner of prior art having a window guiding channel, a slot for accessing the channel extending from end–to–end of the jamb liner and an insert for covering portions of the slot.

*Primary Examiner*—P. W. Echols
*Attorney, Agent, or Firm*—Price, Heneveld, Cooper, DeWitt & Litton

[57] ABSTRACT

An apparatus and process for forming a discontinuous slot, recess or other such opening of predetermined size and location in an extrusion section, such as a window jamb liner. The apparatus includes a cutting or shaping device mounted on or closely adjacent an extruding die, such device including a tip movable between a retracted position and an extended position. In the extended position, the tip engages the extrusion as the extrusion is formed and leaves the die, to thereby slit or otherwise remove a strip or other predetermined amount of material from the extrusion and thus form a recess or opening. As the cutter-like member is extended into or retracted from the extrusion, the tip of the cutterlike member shears the extrusion cross-wise to form an opening which may form an end of a slot and the length of time the tip remains in such contact with the extrusion determines the slots length. An extruded window jamb liner manufactured by the apparatus and process is also provided, the jamb liner including at least one discontinuous opening of predetermined length and location.

7 Claims, 5 Drawing Sheets

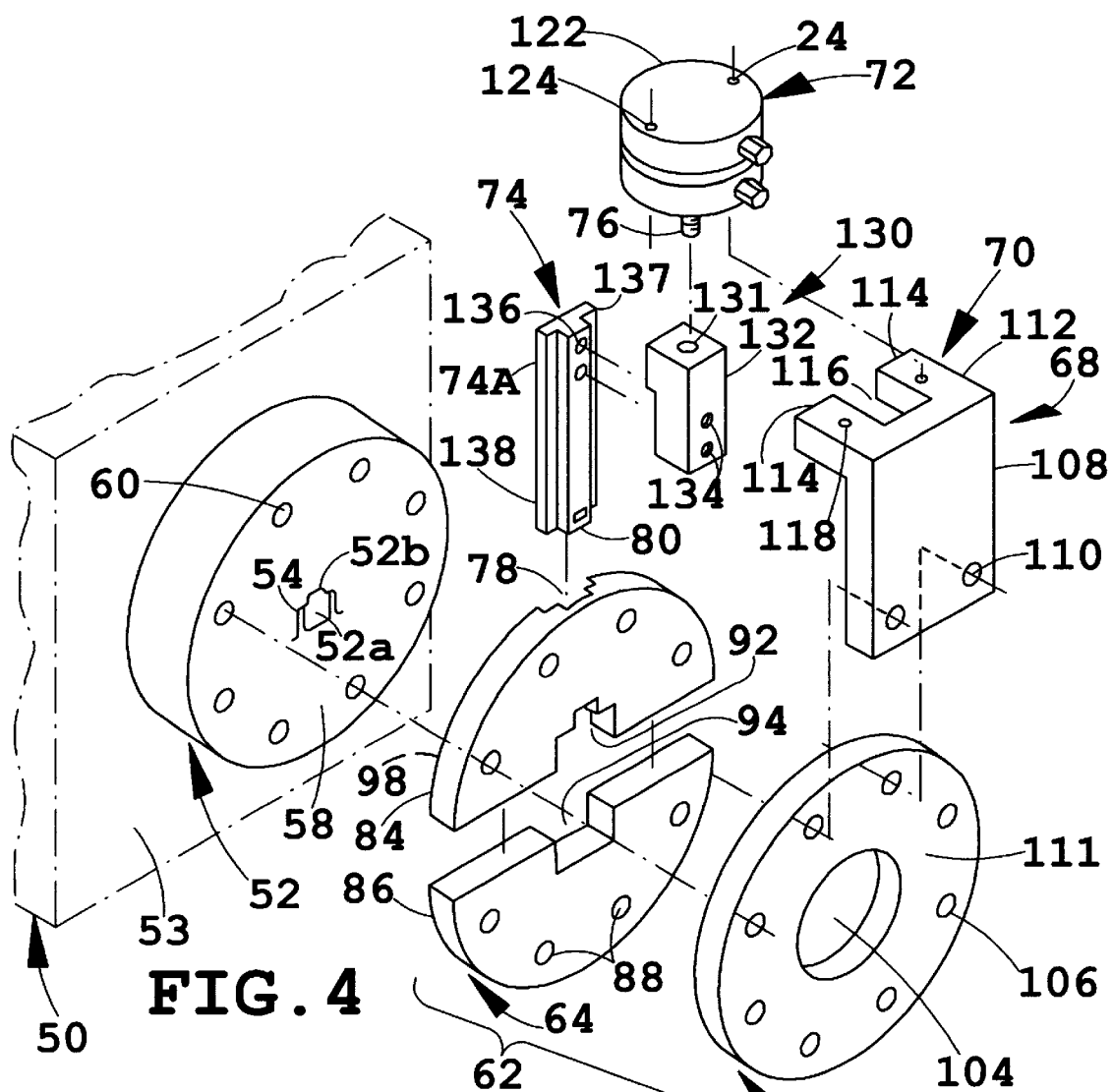
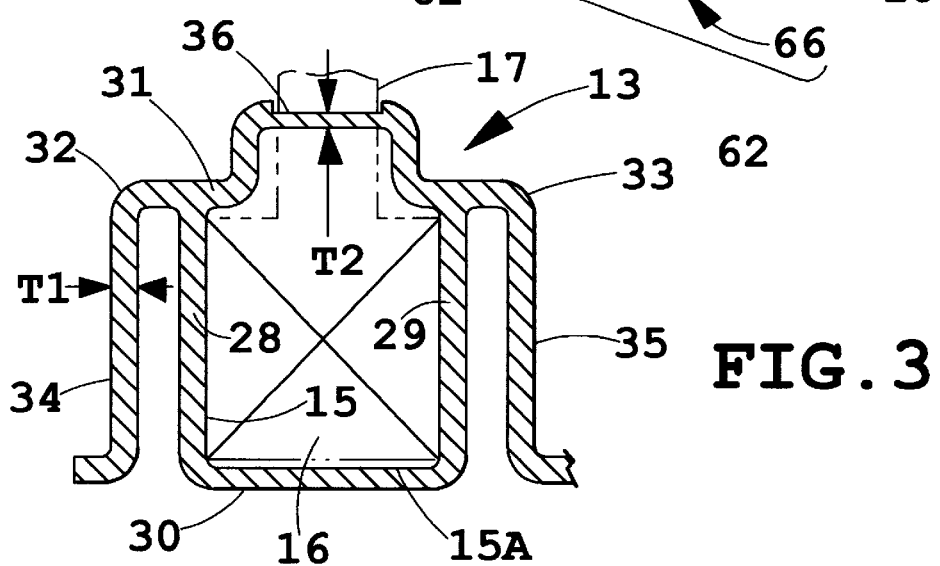
FIG. 4
FIG. 3

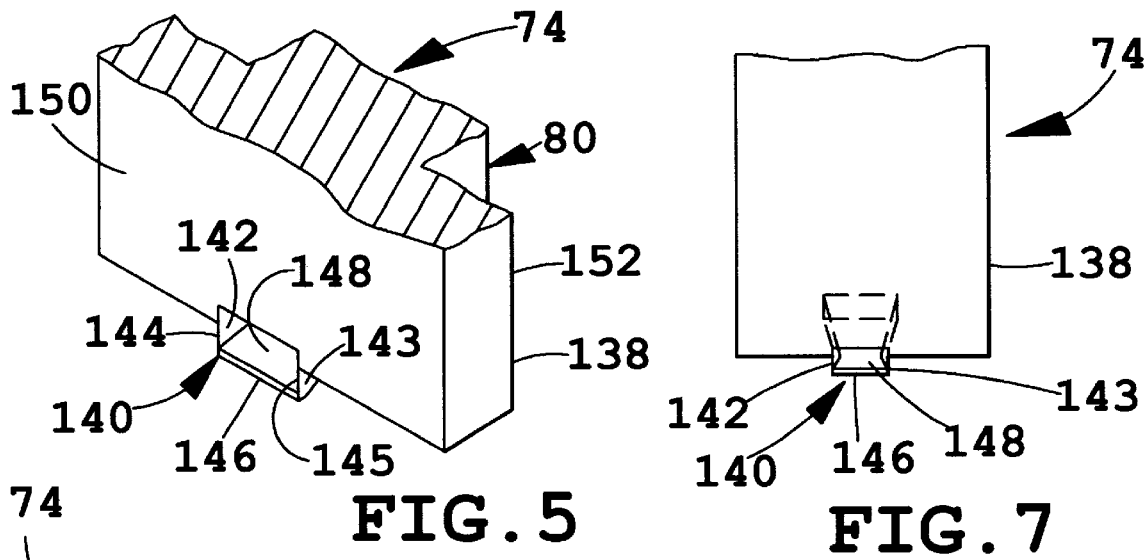
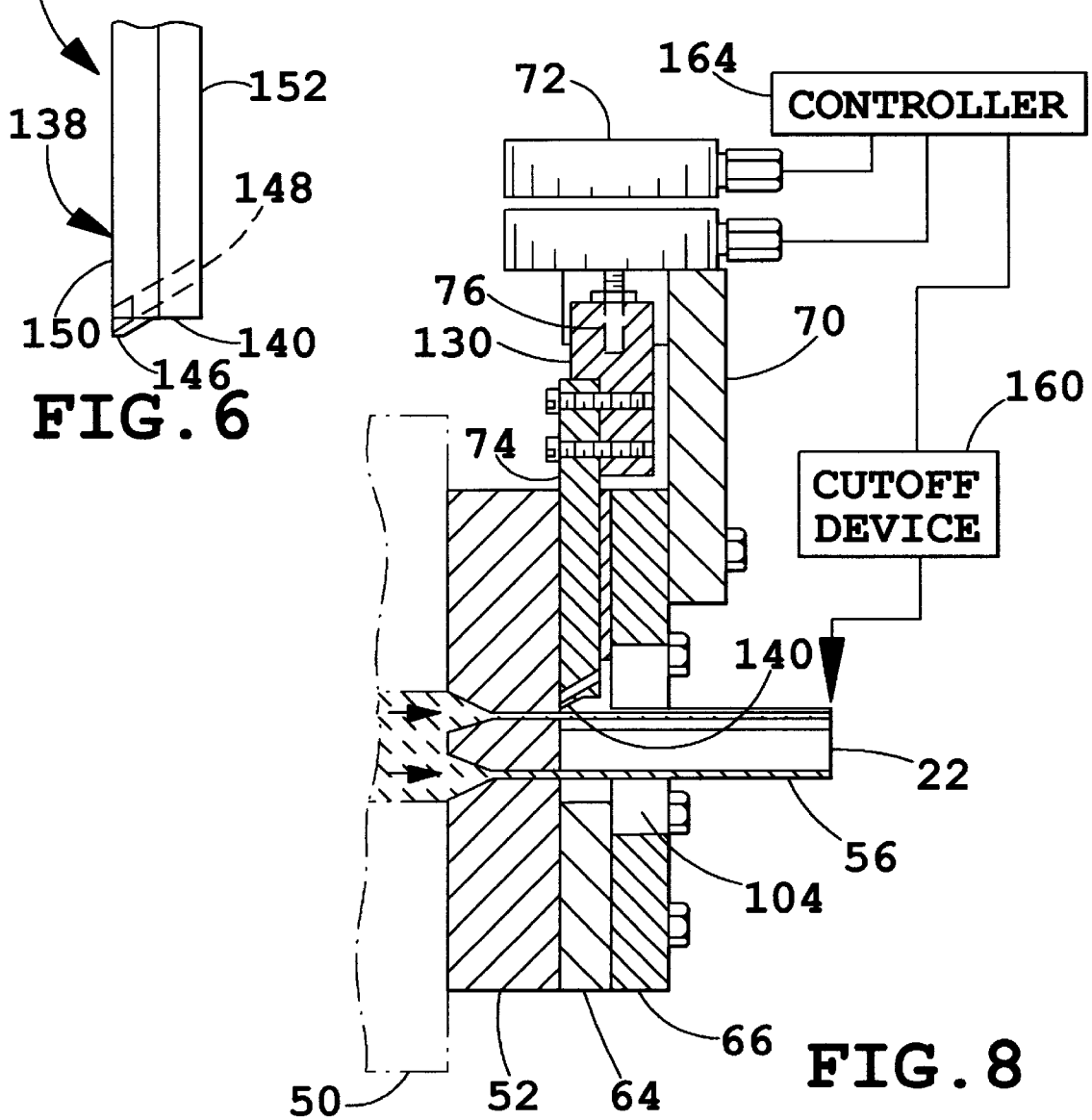

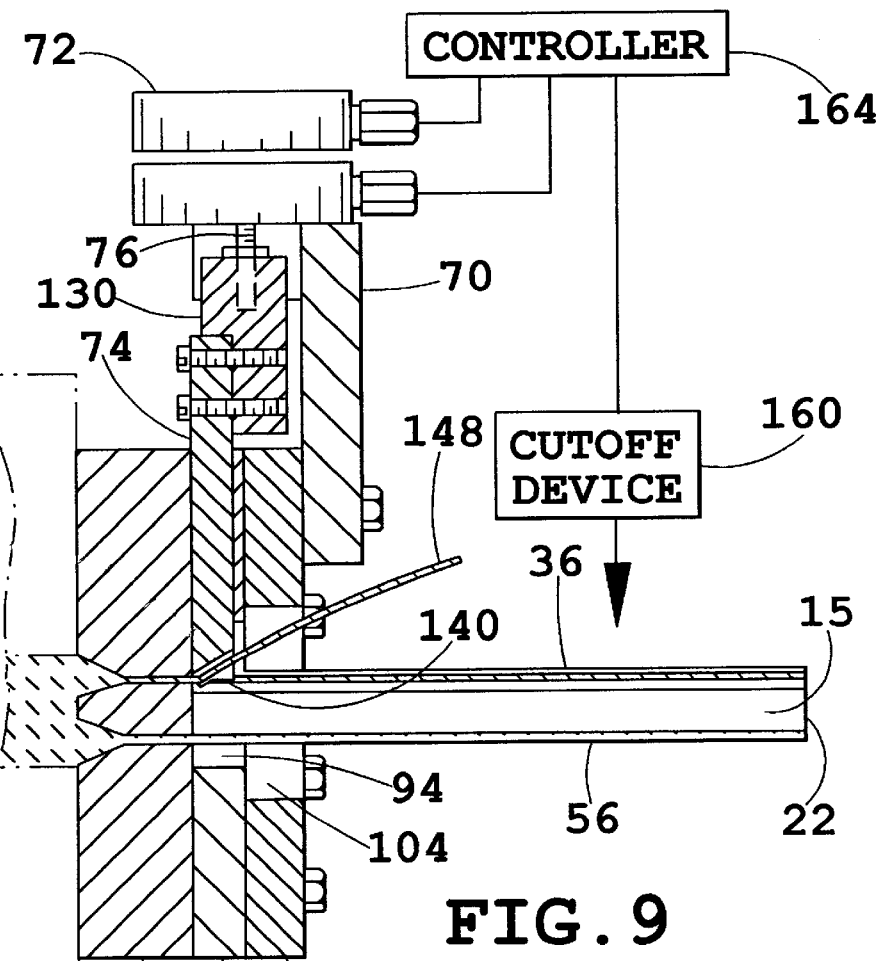
FIG. 9
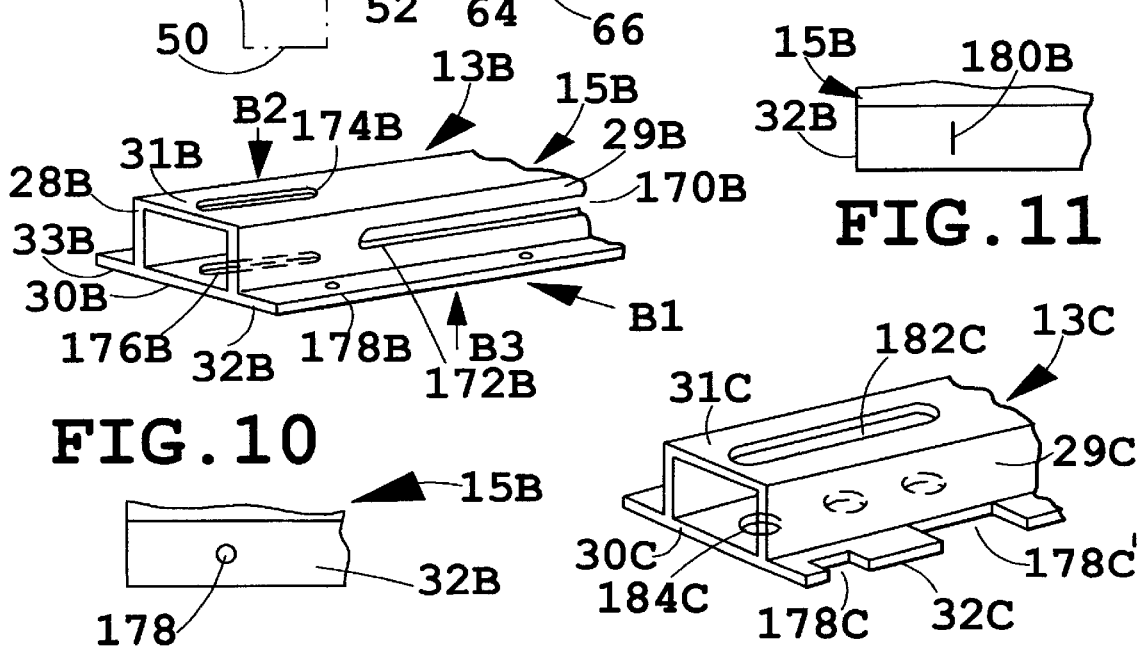
FIG. 10  FIG. 11
FIG. 12  FIG. 13

METHOD FOR MAKING EXTRUDED ARTICLES

This is a continuation of application Ser. No. 08/257,644 filed on Jun. 9, 1994 now abandoned.

BACKGROUND OF THE INVENTION

The present invention concerns an apparatus and process for use with extruding equipment, and more particularly concerns an apparatus and process for economically forming a discontinuous slot, hole or groove in an extrusion such as, but not limited to, an extruded window jamb liner. The present invention further includes articles made by the aforementioned apparatus and process.

Window assemblies with sliding window sash include opposingly positioned window jamb liners that guide vertical movement of the sliding window sash. The jamb liners are often extruded since this is a cost-effective way of manufacturing an elongated, continuous shape. Typically, the window jamb liner includes one or more channels extending the length of the jamb liner that act as guides for the sash, and the sliding window sash include one or more friction-generating sash supports operably movably positioned in the jamb liner channels for controlling the movement of the sliding window sash. A sash-engaging member extends from each friction-generating sash support through a slot in the jamb liner into engagement with the window sash.

A variety of window jamb liners are known which have slots extending the full length of the window jamb liner. However, dirt, debris and foreign objects may collect in the slots, particularly at an end of the window jamb liner where the slots are not wiped clean by movement of the sliding window and the sash-engaging member. Further, long open slots create an unattractive appearance since they are in a highly visible location.

One alternative to resolve this problem is to cover the window jamb liner slot, and various ways have been contrived for attempting to do so with respect to all or portions of this slot. In one known jamb liner, a strip-like insert is positioned in the slot to cover portions of it. In another known jamb liner, the slot comprises a narrow slit in a deformable portion of a dual-durometer jamb liner. However, these methods require secondary operations which are expensive and labor-intensive and/or utilize separate parts, complex extrusions, etc., which may present quality control problems. Further, the slot-covering insert or flap may come loose or deform over time, thus resulting in the same problem they were intended to solve.

Aside from the above-noted window assemblies, there are numerous situations where it is desirable to form discontinuous slots, holes or grooves in extrusions. However, as noted above, forming discontinuous slots, holes or grooves in an extrusion requires secondary operations, which are labor intensive and may present quality control problems. Further, it is desirable to form the discontinuous slots, holes or grooves without the need for complex machinery, since complex machinery requires continuing maintenance. Also, it is desirable to form these features without the need for multiple spinning cutting bits/rotating blades which require frequent sharpening of the cutting surfaces and leave rough or sharp edges.

Thus, an apparatus and process for efficiently and cost-effectively forming holes or discontinuous slots or grooves of predetermined length and position in an extrusion has long been needed. Further, apparatus, processes and articles are desired which solve the aforementioned problems.

SUMMARY OF THE INVENTION

The present invention includes a process for manufacturing an extrusion, such as a window jamb liner, having one or more discontinuous slots or other such openings therein. The process includes extruding the extrusion and forming one or more discontinuous opening in the extrusion as an integral part of the extrusion process. In one aspect, the process includes use of a shaper or cutter element associated with or directly adjacent the extruding die. The shaper or cutter element is configured to be periodically extended into and retracted out of the path of the extrusion, for removing or otherwise repositioning a predetermined amount of material from the extrusion as or immediately after it is initially formed, to thus form one or more discrete, discontinuous openings of predetermined shape and position in the extrusion. In another aspect, the process includes using a cutoff device to cut the extrusion into a predetermined length, and operating the cutoff device to separate the extrusion into segments having a predetermined length and having one or more of the discontinuous openings defined in a predetermined position along and within the predetermined length.

The present invention further includes an apparatus including an extruding die and a cutting or shaping member operably associated with the extruding die. The cutting device may comprise a gouge-like diverter which is movable between a retracted position and one or more extended positions for removing sections of material from the extrusion as the extrusion is formed and leaves the extruder die. The apparatus further includes means for moving the cutter between the extended position and the retracted position.

The present invention further includes an extrusion having one or more discontinuous slots, holes or grooves therein, which items are formed by a cutter/diverter positioned adjacent an extruding die for extruding the extrusion, and which thus are accurately located and also provide optimal shaping characteristics around the slots, holes or grooves.

An object of the present invention is to provide a low cost, slot-forming or hole-forming apparatus and method which can be utilized with an extruder to form an extrusion having one or more discrete, discontinuous openings of predetermined size and shape which are integrally defined in the extrusion on an "as formed" basis. By using the apparatus in combination with a cutoff device, an extrusion having a slot of predetermined size and shape in a predetermined location can be efficiently manufactured at low cost and with high quality. Further, the apparatus forms the slot/hole in the extrusion while the extrusion is adjacent the extruding die outlet and its material is still soft and pliable, thus improving tool life and reducing maintenance.

These and other features, objects, and benefits of the invention will be recognized by those who practice the invention and by those skilled in the art, based on a thorough reading and review of the specification, the claims, and the appended figures.

BRIEF DESCRIPTION OF THE DRAWINGS

FIG. 3 is an enlarged cross-sectional view of the jamb liner taken along the plane III—III in FIG. 2;

FIG. 4 is an exploded view of an extruding die including a slot-forming device embodying the present invention, the extruding die and slot-forming device being configured to manufacture the extrusion shown in FIGS. 2 and 3;

FIG. 5 is a fragmentary perspective view of the cutter/diverter of the slotforming device shown in FIG. 4;

FIG. 6 is a fragmentary side view of the cutter/diverter shown in FIG. 5;

FIG. 7 is a fragmentary front view of the cutter/diverter shown in FIG. 5;

FIG. 8 is a side cross-sectional view of an assembly including the slot-forming device and the extruding die shown in FIG. 4, the cutter/diverter being shown in the retracted position;

FIG. 9 is a side cross-sectional view of the assembly shown in FIG. 8, the cutter/diverter being shown in the extended extrusion-engaging position;

FIGS. 10–17 are exemplary alternative embodiments of extrusions embodying the present invention, FIGS. 11 and 12 illustrating the change in the shape of a transverse slit over time and FIG. 16 showing a cross section taken along the plane XVI–XVI in FIG. 15.

DETAILED DESCRIPTION OF THE PREFERRED EMBODIMENTS

Figure 1:
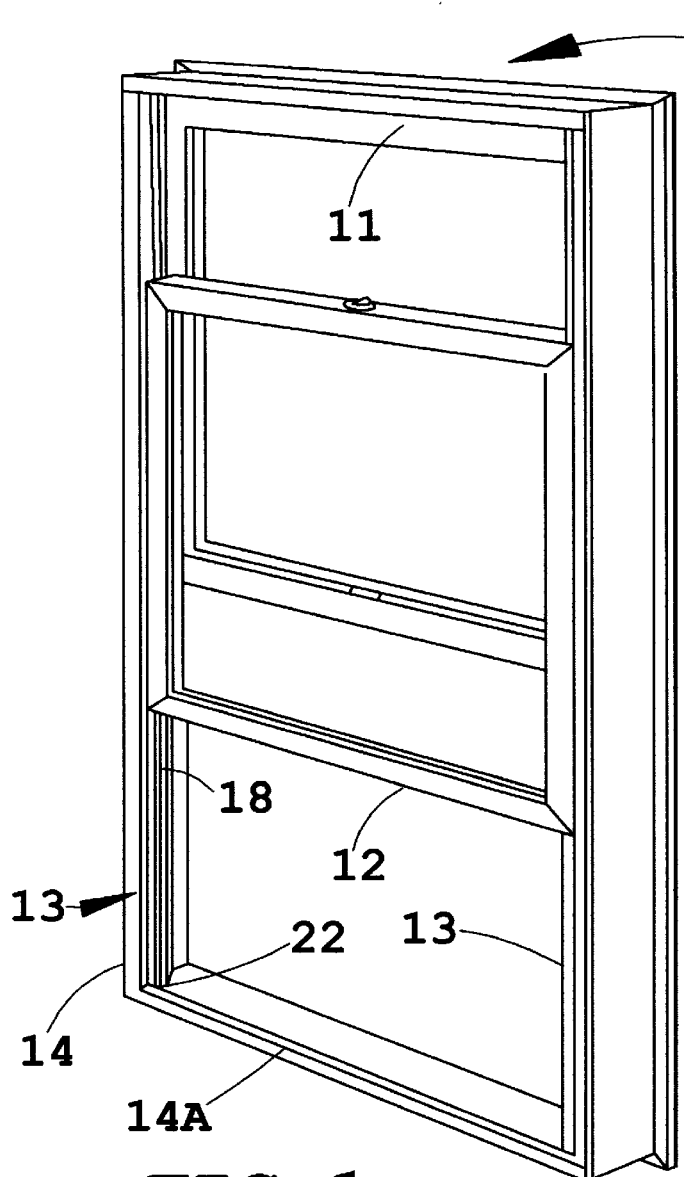
FIG. 1 is a perspective view of a window assembly including an extruded window jamb liner embodying the present invention.

Referring to FIG. 1, a window assembly 10 is shown including extrusions embodying the present invention. However, the present invention is contemplated to be applicable to any extrusion having slots, holes or grooves, etc. therein ("openings" or "recesses"), including extrusions made of polymeric materials such as PVC and nonpolymeric materials such as aluminum.

Window assembly 10 is of the double hung type, having an upper sash 11 and a lower sash 12. The lower sash 12 is supported for sliding vertical movement between a pair of jamb liners 13, one on each side of the window frame 14. Only one jamb liner 13 is visible in FIG. 1, however the two jamb liners 13 are mirror images of each other and operate in identical ways. Thus, to facilitate a concise discussion, only one jamb liner is discussed hereinafter.

Figure 2:
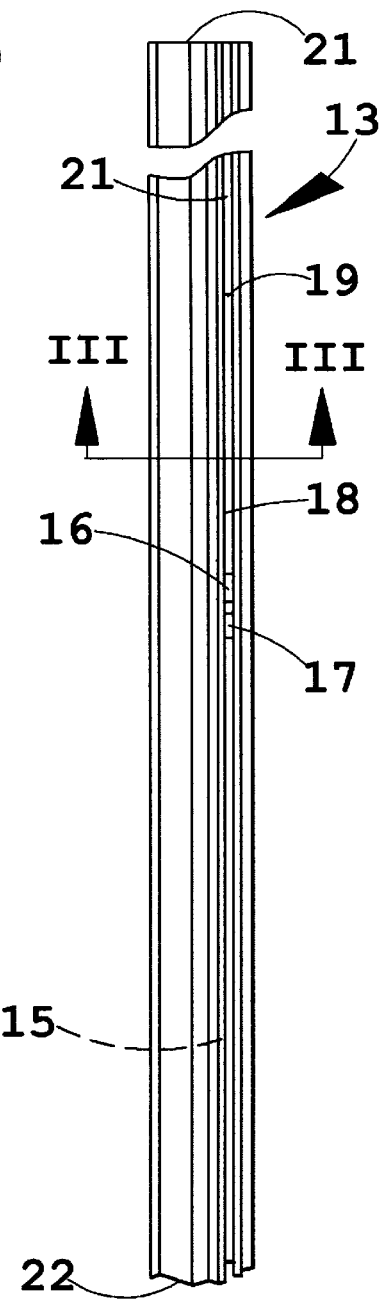
FIG. 2 is an enlarged fragmentary view of the window jamb liner shown in FIG. 1 including a discontinuous slot formed therein.
Figure 3A:
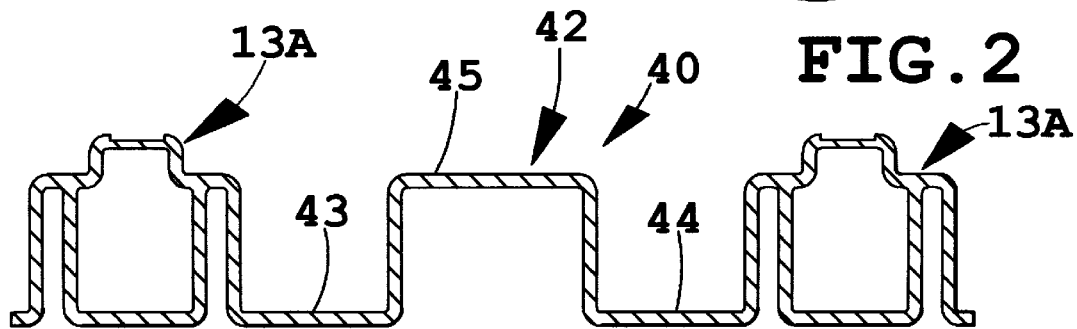
FIG. 3A is a further enlarged cross-sectional view of an alternative jamb liner for a double hung window.
Figure 14:
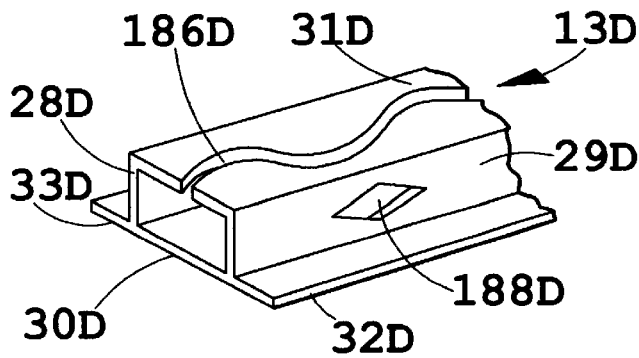
Figure 15:
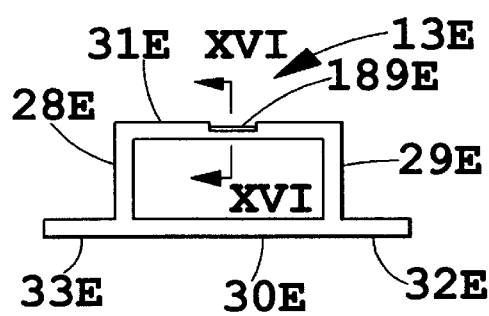
Figure 16:
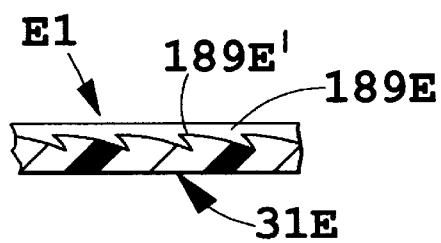
Figure 17:
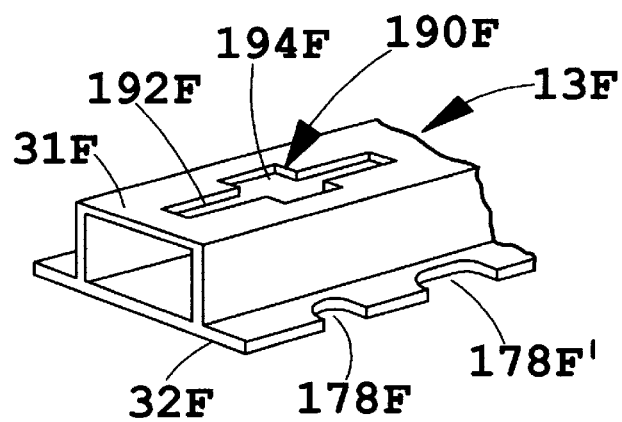

The illustrated jamb liner 13 (FIG. 1) is made of a polymeric material such as PVC and is configured for guiding the vertical movement of the sash 11 and 12. For this purpose, jamb liner 13 defines a pair of elongated channels 15 (FIG. 2), one for each sash. Channel 15, for lower sash 12, is representative of each such channel and includes an inner space 15A (FIG. 3) configured to receive a friction-generating sash support 16. The frictiongenerating support 16 is adapted to slide within elongated channel 15 and support the weight of sash 12 when sash 12 is released. Friction-generating supports for sash are generally known in the art and need not be disclosed in detail in this application for a complete understanding of the present invention.

The friction-generating support 16 (FIGS. 2 and 3) is attached to lower sash 12 by one or more sash-engaging members 17 that extend through a slot 18 in jamb liner 13 and into channel 15. Slot 18 (Fig. 2) is discontinuous and extends only partway along the length of jamb liner 13. Accordingly, slot 18 includes an end 19 that is positioned short of the upper end 21 of jamb liner 13. The length and position of slot 18 in jamb liner 13 is designed to allow lower sash 12 to move its full path of travel between a fully open position and a fully closed position. At the same time, the unspotted area 23 extending from the end 19 of slot 18 to the upper end 21 of the jamb liner 13 provides a smooth, unbroken, finished appearance which eliminates the visually unattractive open slot area typically present at the upper end of jamb liners. Notably, since the sash-engaging members 17 may be located in an intermediate position along the side of sash 12, the slot 18 may extend only partially along the visible open area above upper sash 11. Further, the unslotted area 23 forms a tubular section with channel 15 and thus adds strength to jamb liner 13.

Referring now to the cross section of jamb liner 13 shown in FIG. 3, channel 15 is defined by sidewall sections 28 and 29, a window frame engaging bottom section 30 and a hat-shaped section 31, which all combine to form a tubular shape having an inner space 15A. L-shaped sash-engaging flanges 32 and 33 extend laterally from opposite sides of sidewall sections 28 and 29, respectively, and include outer leg sections 34 and 35 that extend parallel to sidewall sections 28 and 29. Sections 28–35 may all have a common thickness T1. This facilitates uniform cooling of the extrusion during the extruding process. However, hat-shaped section 31 includes a mid-section 36 (i.e. the unslotted portions 23 in FIG. 2) having a reduced thickness T2. Reduced thickness T2 illustrates the recessing or grooving capabilities of the invention and may be used to facilitate formation of a discontinuous slot 18 or other such opening, as discussed hereinafter, by providing less material for a diverter-type cutter to remove. At the same time, the presence of mid-section 36, when it is not cut away, provides a tubular shape having a visually attractive appearance and further having the increased rigidity and structure of a tubular shape. Notably, jamb liner 13 has a continuous shape or profile, with the exception that strips of material are cut away at predetermined locations from mid-section 36 to form discontinuous slots 18.

It is noted that an alternative jamb liner 40 (FIG. 3A) embodying the present invention can be manufactured for a double hung window by interconnecting a pair of window-sash-guiding profiles 13A with a mullion 42. The illustrated mullion 42 is hatshaped, and includes opposing flanges 43 and 44 extending laterally. Profiles 13A are each similar to the cross-sectional shape of extruded jamb liner 13, and are interconnected to mullion 42 by flanges 43 and 44 along the ends of inner flange leg section 34 (or 35). The center section 45 of mullion 42 is configured to space a pair of adjacent sash (11,12) a predetermined distance apart so that each may slide vertically past the other a certain distance, but their frames will slidably engage to form an airtight joint when in the fully closed position.

Previously, continuous slots extending the complete length of window jamb liners were the industry standard since it was not economically feasible to separately cut special discontinuous slots after extrusion. However, the present invention including the process and apparatus disclosed hereinafter permit efficient and cost-effective manufacture of a jamb liner having a discontinuous slot. Further, the extrusion is advantageously formed by a continuous uniform flow of material through the extruder die and the discontinuous slot is formed by cutting away a strip of material as the extrusion exits the extruder die. Thus, the material properties along the extrusion are uniform, since the longitudinal laminar flow of polymeric or other materials is not intermittently disrupted as the discontinuous slot is formed.

An exemplary extruder 50 is shown in FIGS. 4 and 8 including an extruding die 52 connected to the output end 53 of extruder 50. Extruding die 52 includes inner and outer die sections 52A and 52B that define a die opening 54 having the cross-sectional profile of jamb liner 13. Extruding die 52 is configured to form an extrusion 56 (FIG. 8) that can be cut into segments for manufacturing jamb liners 13. Extruding die 52 includes a face 58 with multiple holes 60, to which a slot-forming device 62 is attached. An exemplary and preferred embodiment of a slot-forming device 62 includes an adapter plate 64 configured for flush attachment to die face 58, and optionally also includes a retainer plate 66 for securing adapter plate 64 to face 58. Notably, retainer plate 66 may not be needed in some applications, depending upon the force on adapter plate 64. An L-shaped actuator holding bracket 68 is attached to adapter plate 64 and/or retainer plate 66, and includes a mounting section 70 for supporting an actuator 72 adjacent the side of adapter plate 64. Actuator 72 can be pneumatic, hydraulic, electric, cam-actuated, screw-driven, or otherwise moved by mechanisms known in the machinery arts. A cutter 74 is operably connected to an extendable rod 76 on actuator 72, and extends into channel 78 in adapter plate 64. The tip 80 of cutter 74 is located proximate die opening 54 and is moveable into and out of alignment with die opening 54 to cut a predetermined amount and shape of material from extrusion 56 as extrusion 56 is extruded from die 52.

More specifically, adapter plate 64 includes two portions 84 and 86 which mate together to form a plate. Adapter plate 64 includes holes 88 alignable with holes 60 in the face 58 of extruding die 52. Portions 84 and 86 include apertures 92 and 94 that join together as portions 84 and 86 are attached to extruding die 52 to form an aperture 92/94 through which extrusion 56 extends after exiting the extruding die opening 54. The die-engaging surface 98 on the back side of portion 84 includes a laterally extending channel 78. Channel 78 can be hat-shaped and, when portion 84 is fastened to die face 58, forms a guide for receiving cutter 74. As discussed below, it is contemplated that portion 86 can also define one or more channels (78) for receiving additional cutters or shapers (78) oriented at any angle desired.

Where retainer plate 66 is needed, it includes a center hole 104 and further includes a series of holes 106 located around center hole 104. Screws (not shown) extend through holes 106 and through holes 88 to secure the slot-forming device 62 to extruding die 52.

Actuator holding bracket 68 is L-shaped and includes a first leg 108 having a pair of holes 110 that align with the upper two holes 106 on retainer plate 66. A pair of bolts (not shown) extend through holes 110 and 106 threadably into die holes 60 and secure actuator holding bracket 68 to the downstream side 11 of retainer plate 66. Actuator holding bracket 68 further includes a second leg 112 that extends longitudinally from first leg 108 to a position beside extruding die 52. Second leg 112 includes a pair of protrusions 114 that define a space 116 therebetween. Each protrusion 114 includes a threaded hole 118.

Actuator 72 includes a housing 122 having a pair of holes 124 for receiving attachment screws (not shown). The screws extend through holes 124 and threadably engage holes 118 in actuator holding bracket 68 to secure housing 122 to bracket 68. Actuator 72 further includes an extendable rod 76 for actuating cutter 74 that extends through space 116. A rod connector 130 includes a threaded end 131 for securely engaging the end of rod 76, and includes a body 132 having holes 134 that extend perpendicularly through body 132.

Cutter 74 includes an elongated hat-shaped section with side sections 74A that slidably engage the sides of channel 78 in adapter plate 64. A pair of holes 136 are located at one end 137 and are alignable with holes 134 in rod connector 130 so that a pair of screws (not shown) can be extended through holes 134 and 136 to secure cutter 74 to rod connector 130. The other end 138 of cutter 74 is particularly configured to cut a strip out of extrusion 56 as extrusion 56 is extruded and exits from extruding die opening 54. It is noted that numerous shapes of cutter 74 are possible, and accordingly the illustrated cutter 74 is not intended to be unnecessarily limiting.

A particular example of one preferred shape for the configured end 138 of cutter 74 is shown in enlarged FIGS. 5–7. Configured end 138 includes a tip 140 which comprises basically an open, rectangular chisel-like or gouge-like member. Tip 140 (FIG. 5) includes a pair of spaced apart blades 142 and 143 having sharpened edges 144 and 145, and a web or deflector 146 extending between the ends of blades 142. A channel 148 is thus defined between blades 142 and 143, web 146, and the body of cutter 74. Channel 148 extends at an angle from the extruding die side 150 of cutter 74 through the body of cutter 74 to its opposite or downstream side 152. Notably, tip 140 is positioned rearward of, and preferably immediately adjacent, face 58 of extruding die 52. As cutter 74 is extended, the upstream side of web 146 slides shearingly through mid-section 36 of extrusion 56, which is at this point still softly deformable in consistency since just formed. The reduced thickness T2 of mid-section 36 facilitates the passage of cutter tip 140 through extrusion 56, but is not deemed essential to that. The scissor-like shearing action between web 146 and the inner die section 52A defining the inside of extrusion 56 allows cutter 74 to cleanly and sharply enter the inner space 15A in the tubular section of extrusion 56. Further, the shearing action between web 146 and the outer die section 52B defining the outside of extrusion 56 allows cutter 74 to sharply and cleanly retract from engagement with extrusion 56.

As will be understood, various shaping, sizing and cooling stations and devices (not shown) will typically be used downstream of extruding die 52 and slotting device 62. A cutoff device 160 (FIGS. 8 and 9) is positioned downstream of device 62 to cut the finished extrusion 56 into segments having a predetermined desired length, thus forming jamb liners 13. Further, cutoff device 160 and actuator 72 are operably connected to a controller 164 so that, by simultaneously controlling both actuators 72 and cutoff device 160, discontinuous slot 18 can be located in a predetermined position and have a predetermined length along the extruded segment. Thus, the particularly slotted jamb liner 13 can be efficiently and accurately formed in essentially any length, and shape and slot pattern.

Having described the components of the extruding die and their relationship, the operation of the present invention will become apparent to those of ordinary skill in the art. Extruder 50 is initially operated (FIG. 8) so that extrusion 56 is continuously extruded from extruder die 52 in the shape of extrusion die opening 54. As extrusion 56 continues to be extruded out of extruding die 52, controller 164 senses the position of the end of extrusion 56 and at the appropriate time actuates actuator 72 in order to extend cutter 74. As cutter 74 is extended (FIG. 9), it shears against inner die section 52A through thin wall mid-section 36 into extrusion 56. As extrusion 56 continues to be extruded, cutter 74 cuts a strip of material 144 from extrusion 56. The strip 144 is deflected at an angle by web 146 through channel 148 upwardly away from the tubular section of extrusion 56. At the appropriate time and when discontinuous slot 18 has the desired length, controller 164 actuates actuator 72 to retract cutter 74. As cutter 74 is retracted, web 146 shears against outer die section 52B to separate strip 144 from extrusion 56, leaving discontinuous slot 18 defined within extrusion 56. As extrusion 56 continues to be extruded from extruding die 52, controller 164 actuates cutoff device 160 to separate a segment of predetermined length from extrusion 56. The segment thus forms a jamb liner 13 having a discontinuous slot 18 therein of a predetermined length and position, as desired.

ALTERNATIVE EMBODIMENTS

Figure 18:
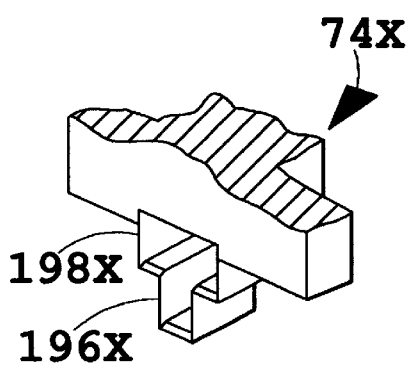
FIGS. 18–20 are exemplary alternative embodiments of cutters embodying the present invention.
Figure 19:
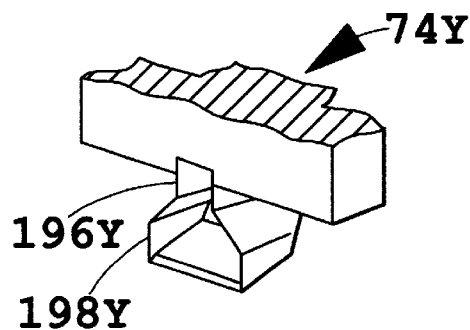
Figure 20:
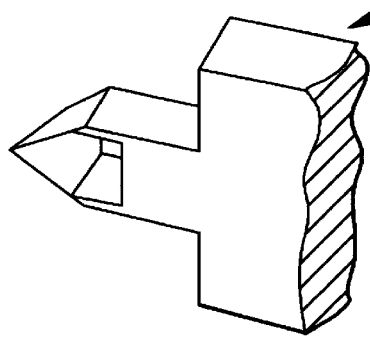

Additional features of the underlying invention are illustrated in the alternative extrusions 13B–13F (FIGS. 10–17) and the alternative cutters 74X–74Z (FIGS. 18–20). To reduce repetitive discussion, comparable features are identified with identical numbers as were used when describing extrusion 13 and cutter 74, but with the addition of identifying letters such as "B," "C" and etc. It is noted that the present alternative extrusions 13B–13F and cutters 74X–74Z are relatively simple in their construction. However, it is contemplated that extrusions and cutters could be developed which are substantially more complex and intricate without departing from the concepts disclosed and claimed in the present application.

Extrusion 13B (FIG. 10) illustrates an article having a hat-shaped channel 15B including sidewall sections 28B and 29B, a bottom section 30B, and a top section 31B. Flanges 32B and 33B extend laterally from channel 15B. A discontinuous slot 170B is located in sidewall 29B. Slot 170B includes at least one end 172B, and is formed by a cutter (not specifically shown, but generally similar to cutter 74) which engages sidewall section 29B along a direction B1. A pair of corresponding slots 174B and 176B are formed in top and bottom sections 31B and 30B, respectively, by a second cutter (not specifically shown, but also generally similar to cutter 74). The second cutter is long enough to simultaneously engage both top and bottom sections 30B and 31B in a direction B2 from the top-section-side of extrusion 13B. Notably, additional wall sections could be also pierced by the second cutter, if desired, and various types and shapes of opening so formed.

Extrusion 13B (FIG. 10) still further includes a plurality of spaced "nailer" holes 178B in flange 32B. Holes 178B could be used, for example, to receive nails or screws for securing extrusion 13B to a substrate. Holes 178B are formed by a third cutter (not specifically shown, but also generally similar to cutter 74). The third cutter is extended and retracted relatively quickly into and out of flange 32B along a direction B3 such that the third cutter cuts a transversely oriented slit 180B (FIG. 11) in flange 32B. Notably, as extrusion 13B exits the extruding die (i.e. at the location adjacent the extrusion die where the cutter engages the extrusion), the outer skin of the extrusion 13B is relatively stable, however most of the material in the extrusion wall sections is relatively higher in temperature and thus still quite soft and pliable. Due to this and the fact that the extrusion is pulled along longitudinally through cooling and sizing stations in a known manner by downstream rollers or the like (not shown), the extrusion is under continuous tension and transverse slit 180B (FIG. 11) thus gradually enlarges axially as the extrusion moves along, to ultimately become a generally rounded hole 178B (FIG. 12).

Extrusion 13C (FIG. 13) includes an elongated slot 182C in top wall section 31C, and a series of holes 184C in bottom wall section 30C generally below slot 182C. Slot 182C is formed by extending a cutter similar to cutter 74 selectively into and out of engagement with top wall section 31C. Holes 184C are also formed by the same cutter by extending the cutter to an increased depth such that it engages both the top wall section 31C and the bottom wall section 30C simultaneously, but for different increments of time. Also, open-sided apertures 178C and 178C' can be formed in side flange 32C, the apertures being formed comparably to the discontinuous slots and holes previously described.

Extrusion 13D (FIG. 14) includes a curving, non-linear slot 186D along top wall section 31D made by moving the cutter (not shown, but similar to cutter 74) back and forth laterally in a predetermined pattern as extrusion 13D exits the extruding die. Also, a diamond-shaped aperture 188D is formed in sidewall 29D. Diamond-shaped aperture 188D is formed by selectively moving a V-shaped cutter (see the cutter 74Z in FIG. 20) into and out of engagement with extrusion 13D. The deeper that the V-shaped cutter is extended into engagement with sidewall section 29D, the larger the width of the strip of material removed from sidewall 29D. Thus, by extending and then retracting the V-shaped cutter quickly, the diamond-shaped aperture 188D may be is formed, elongation occurring as a function of water level. Notably, a U-shaped cutter could be used to cut a round hole by using the same principle of extending and then retracting the U-shaped cutter at a rapid velocity. Alternatively, by extending the V-shaped cutter sinusoidally (i.e. initially at a fast rate and then more slowly at deeper positions), the V-shaped cutter also could be used to cut a round aperture, and various other shapes could be produced by various other velocity profiles.

Extrusion 13E (FIG. 15) includes an elongated recess or groove 189E that extends only partially into top wall section 31E. Recess 189E can be as long as desired and can be extended to a constant predetermined depth within top wall section 31E, if desired. However, it is also contemplated that the cutter (not shown, but see cutter 74) can be selectively moved vertically to form a recess 189E having a saw-tooth-shaped bottom surface 189E'(FIG. 16), a stepped bottom surface, or any other contoured bottom surface as desired. It is further contemplated that "saw tooth" bottom surface 189E' could include an undercut lip such as by moving the cutter tip longitudinally as the cutter is moved into engagement with top wall section 31E. For example, this could be done by orienting cutter 74E at an acute angle such as angle E1 which is acute to the longitudinal axis of extrusion 13E (instead of perpendicular thereto).

Extrusion 13F (FIG. 17) includes a top wall section 31F having a stepped slot 190F with a first section 192F having a first width, and a second section 194F having a second width. Slot 190F is formed by use of a T-shaped cutter 74X (FIG. 18). Cutter 74X includes a first cutter tip section 196X and a second cutter tip section 198X. By extending cutter 74X into top wall section 31F such that, first cutter tip section 196X engages top wall section 29F, the first section 192F of slot 190F is to cut the first width. By extending cutter 74X to a greater depth, second cutter tip section 198X engages top wall section 31F to form the second section 194F of slot 190F having the second width. Notably, by extending cutter 74X to an even greater depth, first cutter tip 196 will engage and cut a narrow slot in the bottom wall section 30F (see FIG. 14). Thus, a large width slot (194F) would be formed in top wall section 29F and a narrow width slot (192F) would be formed in the bottom wall section (30F). Of course, the wide and narrow sections of cutter 74X could be reversed, such as is shown by cutter 74Y (FIG. 19). V-shaped cutter 74Z (FIG. 20) was previously described in regard to diamond-shaped aperture 188D (FIG. 14), but this could also be used to cut a pair of superimposed slots of different widths. Also, rounded apertures 178F and 178F' can be formed in side flange 32F.

Thus, the present invention provides an apparatus and process for forming a discrete, discontinuous slots or other such openings of predetermined size and shape in an extrusion as the extrusion is formed, and for cutting the extrusion into segments of desired lengths. The apparatus and process allow a discontinuous opening or recess to be formed in-line with the extruder as the extrusion is being extruded, and such opening or recess may have essentially any predetermined size, shape and location in the extrusion, even including substantially circular, oval or other such shapes, depending on the particular shape of the cutter element and the relative speed with which it is actuated. In addition, the opening so formed may extend through two or more adjacent walls in the same extrusion, or only partially through selected wall sections where that is desired. Accordingly, all such particular variations in the resulting openings are intended to be included within the basic terms "opening" or "slot" as used herein, and neither this nor other such particular terms used for purposes of illustration above are to be narrowly or restrictively construed when used more generally in the claims. Also, while the apparatus and process of the invention are particularly suited for manufacturing window jamb liners with discontinuous sash-support slots, nailing fins or the like in a low cost, efficient and high quality manner, it should be understood that many other structurally analogous products may also be produced. Furthermore, it should be understood that the particular degree of proximity between the extruder die and the cutter station may be subject to a certain amount of variation, and that this as well as other factors associated with the extrusion process itself will or may vary the specific consistency and relative plasticity of the extrusion at the point where it is severed or otherwise shaped by the "cutter" member to form a groove, "slot" or other "opening" or "recess." Consequently, the specific characteristics of the "cutter" (degree of sharpness, etc.) are also subject to a certain amount of variation.

It will be readily appreciated by those skilled in the art that modifications may be made to the invention without departing from the concepts disclosed herein. All such modifications are to be considered as included within the following claims, unless these claims by their language expressly state otherwise.

What is claimed is:

1. A process for manufacturing extruded polymeric articles, comprising the steps of:
    providing extruding equipment including a shaping die;
    providing a cutter having a pair of spaced apart cutting blades interconnected by a web, wherein the cutter is positioned immediately downstream of said shaping die;
    forcing a polymeric material through said shaping die, thereby forming an extrusion having a plurality of interconnected walls defining a hollow interior, wherein the extrusion moves past said cutter; and
    while said extrusion moves past said cutter,
        (i) passing said web through one of said walls and into said hollow interior and bringing said spaced apart cutting blades into engagement with said one wall such that said one wall becomes severed as said one wall moves past said spaced apart cutting blades; then
        (ii) withdrawing said web from said hollow interior by passing said web through said one wall, thereby removing said spaced apart cutting blades from engagement with said one wall, whereby a section of a distinct shape is removed from said one wall, and a closed opening that corresponds to said distinct shape is formed in said one wall; and then
        (iii) repeating steps (i) and (ii).

2. The method according to claim 1 further including the steps of:
    providing a cutoff device; and
    periodically actuating said cutoff device, thereby cutting said extrusion into a plurality of articles each having a plurality of interconnected walls with at least one of the openings in one of said walls.

3. The method according to claim 1, wherein at least some of the openings have a non-uniform width.

4. A process as defined in claim 1, wherein said extrusion includes a pair of sidewalls extending in generally parallel planes, and wherein said steps of passing and withdrawing said web to form said closed opening includes manipulating the cutter to form at least one of said closed openings in each of said sidewalls, a second said closed opening being located laterally from a first closed opening.

5. A process as defined in claim 1 further comprising using a first cutter for cutting a first closed opening, using a second cutter for cutting a second closed opening, and actuating said first and second cutters along non-aligned paths such that said first and second closed openings are situated differently from one another.

6. A process for manufacturing extruded polymeric articles, comprising the steps of:
    providing extruding equipment including a shaping die;
    providing a cutter having a pair of spaced apart cutting blades interconnected by a web, wherein the cutter is positioned immediately downstream of said shaping die;
    forcing a polymeric material through said shaping die, thereby forming an extrusion having a plurality of interconnected walls defining a hollow interior, wherein the extrusion moves past said cutter; and
    while said extrusion moves past said cutter,
        (i) passing said web through one of said walls and into said hollow interior and bringing said spaced apart cutting blades into engagement with said one wall such that said one wall becomes severed as said one wall moves past said spaced apart cutting blades and a severed strip of material is deflected away from said wall by the web; then
        (ii) withdrawing said web from said hollow interior by passing said web through said one wall, thereby removing said spaced apart cutting blades from engagement with said one wall, whereby a section of a distinct shape is removed from said one wall, and a closed opening that corresponds to said distinct shape is formed in said one wall; and then
        (iii) repeating steps (i) and (ii).

7. A process for manufacturing extruded polymeric articles, comprising the steps of:
    providing extruding equipment including a shaping die;
    providing a cutter having a pair of spaced apart cutting blades interconnected by a tip, wherein the cutter is positioned immediately downstream of said shaping die;
    forcing a polymeric material through said shaping die, thereby forming an extrusion having a plurality of interconnected walls defining a hollow interior, wherein the extrusion moves past said cutter; and while said extrusion moves past said cutter,
(i) passing said tip through one of said walls and into said hollow interior and bringing said spaced apart cutting blades into engagement with said one wall such that said one wall becomes severed as said one wall moves past said spaced apart cutting blades; then
(ii) withdrawing said tip from said hollow interior by passing said tip through said one wall, thereby removing said spaced apart cutting blades from engagement with said one wall, whereby a section of a distinct shape is removed from said one wall, and a closed opening that corresponds to said distinct shape is formed in said one wall; and then
(iii) repeating steps (i) and (ii).

* * * * *